INVENTOR.
WILLIAM L. MARTIN
BY FOWLER, KNOBBE
& GAMBRELL

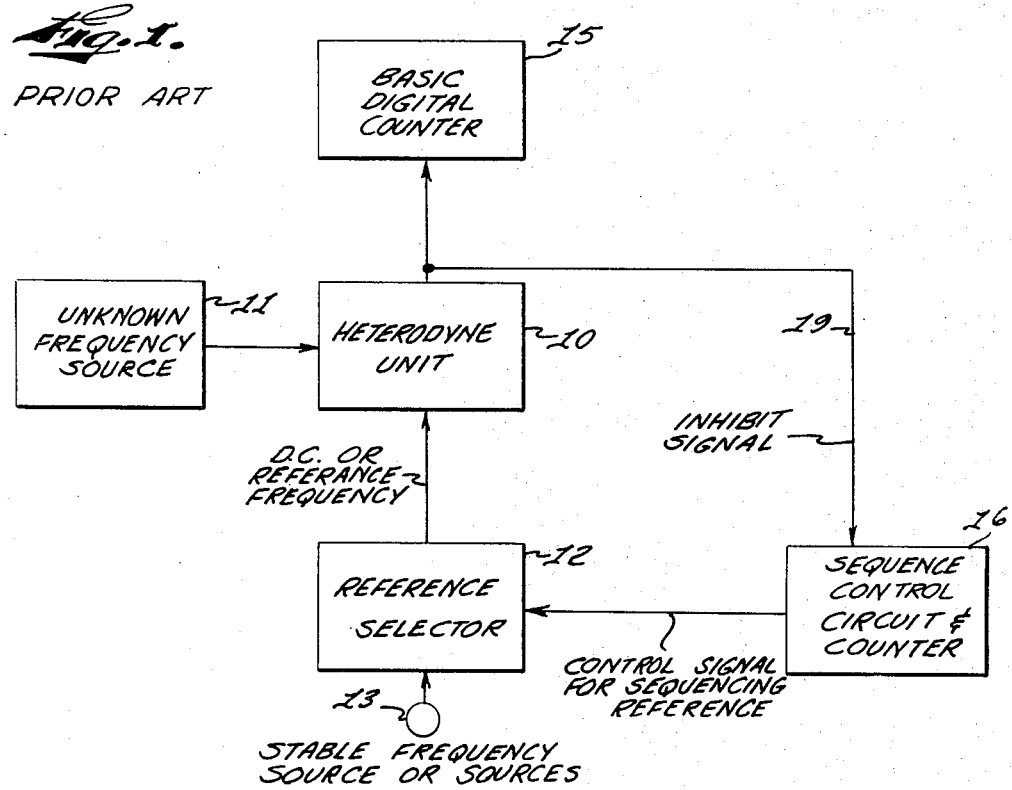
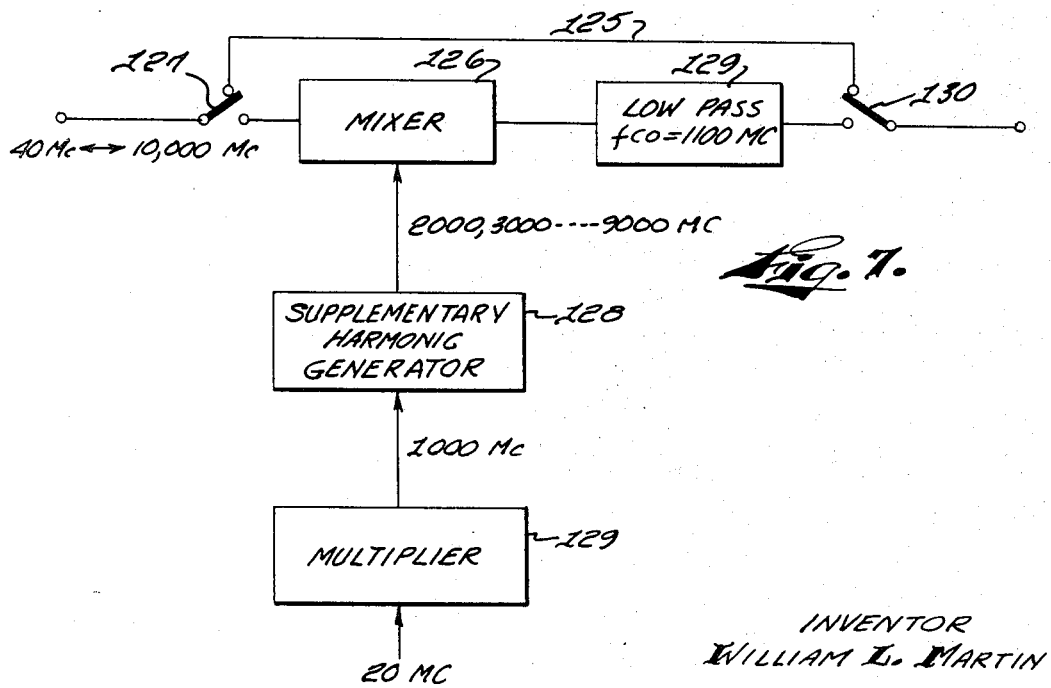

ATTORNEYS

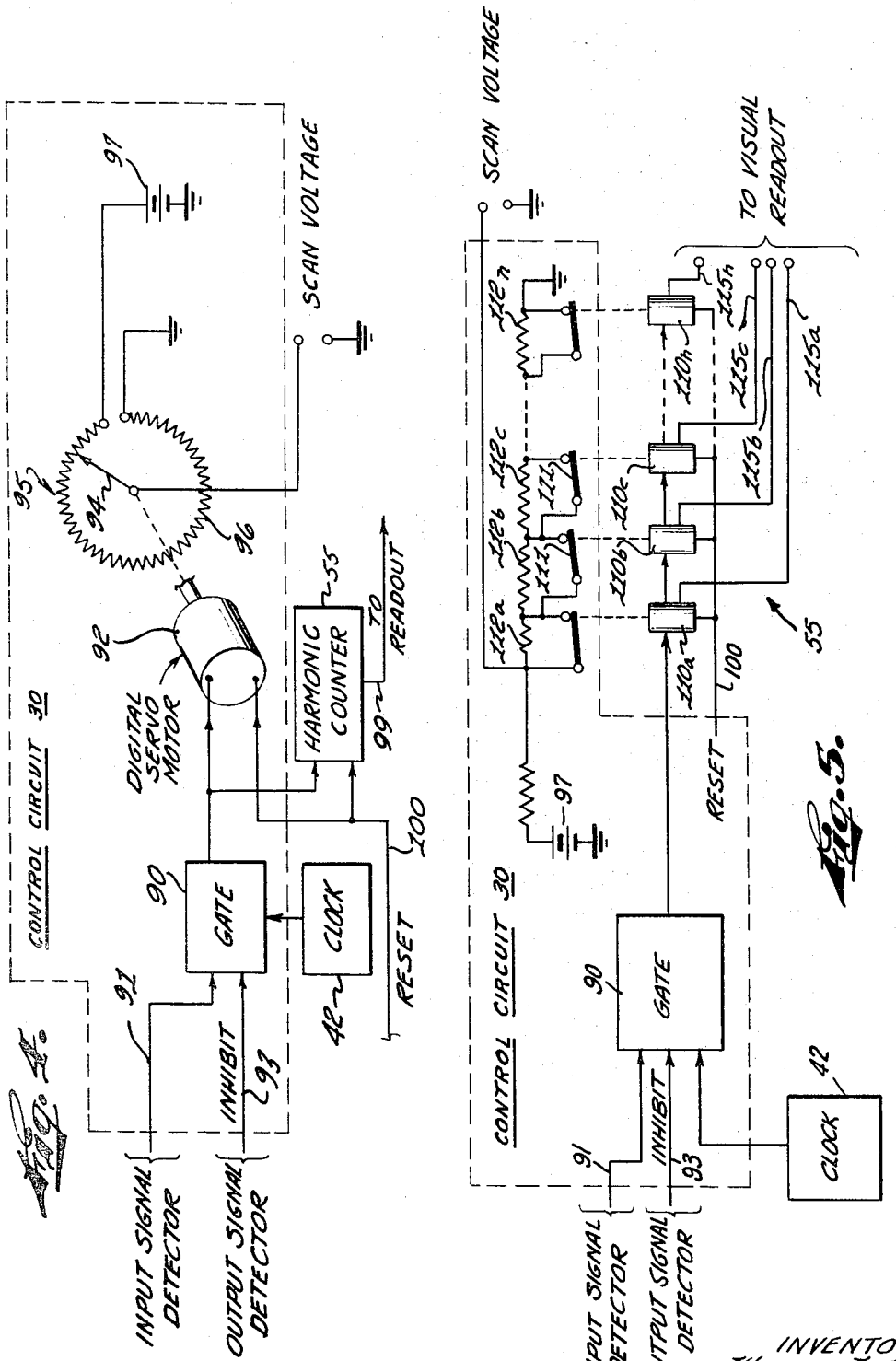

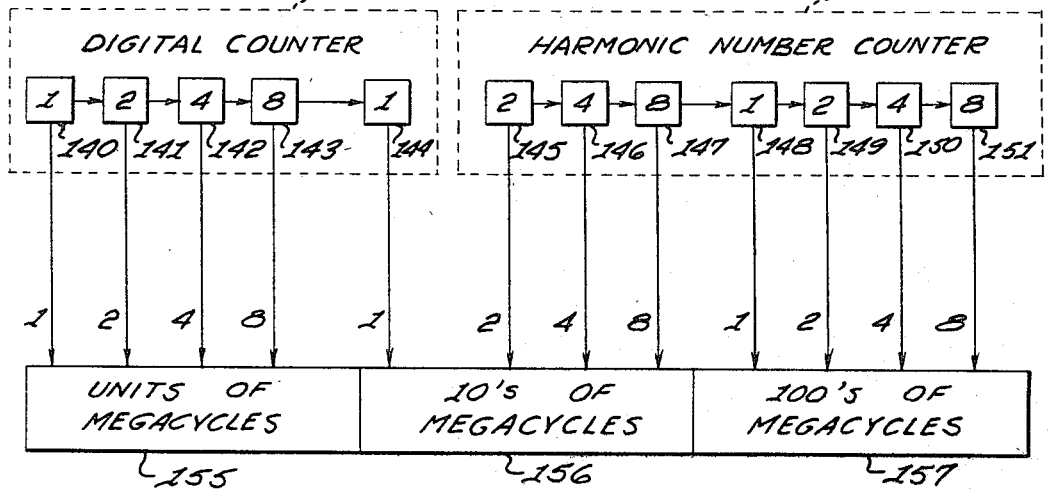
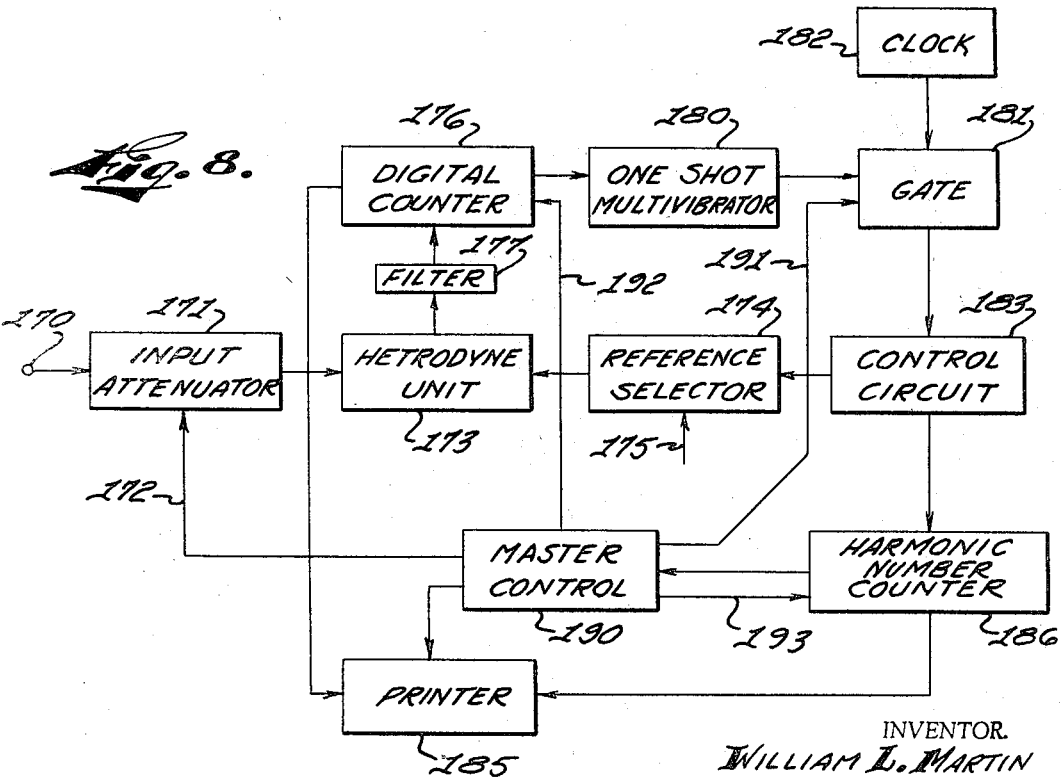

United States Patent Office 3,403,338
Patented Sept. 24, 1968

3,403,338
ELECTRONIC FREQUENCY MEASURING AND SPECTRUM ANALYZING APPARATUS

William Lee Martin, Lafayette, Calif., assignor to Beckman Instruments, Inc., a corporation of California
Continuation of application Ser. No. 358,574, Apr. 9, 1964. This application Mar. 16, 1967, Ser. No. 623,775
18 Claims. (Cl. 324—79)

ABSTRACT OF THE DISCLOSURE

Electronic frequency measuring and spectrum analyzing apparatus for high-speed automatic operation is provided with a control circuit responsive to clock pulses for generating a plurality of reference signals successively increasing in frequency in uniform steps until a difference in frequency of the reference signal and an unknown input signal is within the range of a basic counter as determined by a filter coupling a means for mixing the reference and input signals to the counter. Detecting means responsive to the output of the filter inhibits further pulses from being applied to the control circuit. A separate counter records the number of pulses applied to the reference generator in order to determine with digital accuracy and speed the frequency measured in conjunction with the basic counter. For spectrum analysis, the detecting means inhibits further pulses from being applied to the control circuit only momentarily in order that the frequency energy of a frequency band may be analyzed.

---

This application is a continuation of Ser. No. 358,574, filed Apr. 9, 1964, now abandoned.

The present invention relates to a frequency measuring device and more particularly to one which automatically registers as a decimal or digital value the frequency of an input signal which may vary over a very wide frequency range.

The digital counter is a prior art apparatus which is widely employed for measuring the unknown frequency of a given signal. Such counters equipped with automatic recycling provisions provide decimal readings accurate to plus or minus one cycle per unit time, e.g. one second, one millisecond, etc., with the counter then being reset for subsequent readings. Contemporary solid state circuitry enables such counters to directly count frequencies of the order of 50 megacycles. Tunnel diodes and ultra fast transistor components permit such circuits to count at even higher frequencies. However, such circuits are relatively expensive and furthermore are not capable of counting substantially in excess of 500 megacycles.

One means for counting signals of higher frequency employed in the prior art is to heterodyne the unknown frequency with a signal of known frequency and measure the difference or beat frequency by a digital counter having a range substantially below that of the unknown frequency. Such apparatus is exemplified by U.S. Patent 2,900,601—J. L. Corl et al. Although this type of device is capable of providing a very accurate frequency measurement, it requires that the operator perform manual operations for each frequency measurement. For example, the operator must manually select a particular range so that the correct frequency reference may be heterodyned with the unknown frequency signal.

In the past, some designs have been suggested which provide a device capable of automatically measuring frequencies over a very wide frequency range, e.g. DC to 1,000 megacycles and higher, i.e. frequencies many times the frequency capability of presently available digital counters. All operations during the frequency measuring cycle are automatic so that the user is required only to connect the unknown frequency source to the device.

An object of this invention is to provide improvements over such designs. The features and advantages of the improvements will become apparent as the description proceeds.

Briefly, a preferred form of the present invention includes a frequency mixer for heterodyning the unknown frequency input signal and means for sequentially generating a plurality of reference signals successively increasing in frequency by a predetermined value less than the frequency range of the basic digital counter. The output of the mixer is connected to a filter which passes only those frequencies in the range of the basic digital counter. Means responsive to the output of this filter operatively controls the reference signal generator to sequentially heterodyne the successively higher reference frequencies with the unknown frequency in response to clock pulses gated thereto by an input signal detector until a difference frequency signal of requisite strength is produced at the output of the filter indicative of the automatic selection of the correct reference frequency. This signal produces a control signal for gating off clock pulses, thereby inhibiting further progression of the reference frequency selector. Each reference frequency has associated therewith a digital code for energizing a readout. Accordingly, the readout of the selected reference frequency in combination with the readout of the basic digital counter provides an output containing all of the digits of the unknown input frequency.

Another embodiment of the invention comprises a very wide band spectrum analyzer. In this embodiment, a frequency band substantially wider than the capability of the basic digital counting circuit is scanned and the energy recorded within each one of a plurality of subfrequency bands. Advantageously, the threshold level is automatically reset upon completion of each scan and a new scan is automatically initiated at this reset threshold level. In this manner, both the frequency values and relative signal strengths of the input signal energy may be recorded.

A more thorough understanding of the invention may be obtained by a study of the following detailed description taken in connection with the accompanying drawings in which:

FIG. 1 is an overall block diagram of a wide range frequency measuring device constructed according to the prior art;

FIGS. 4 and 5 illustrate a portion of the control circuitry and alternative embodiments of the scan voltage generator;

FIG. 6 is a detailed block diagram of a specific embodiment of a digital counter and harmonic number counter and their connection to a common visual readout;

FIG. 7 illustrates circuitry for extending the range of the counter of this invention; and FIG. 8 illustrates an automatic frequency scanner and recorder constructed according to the present invention.

General description of the prior art

Figure 2:
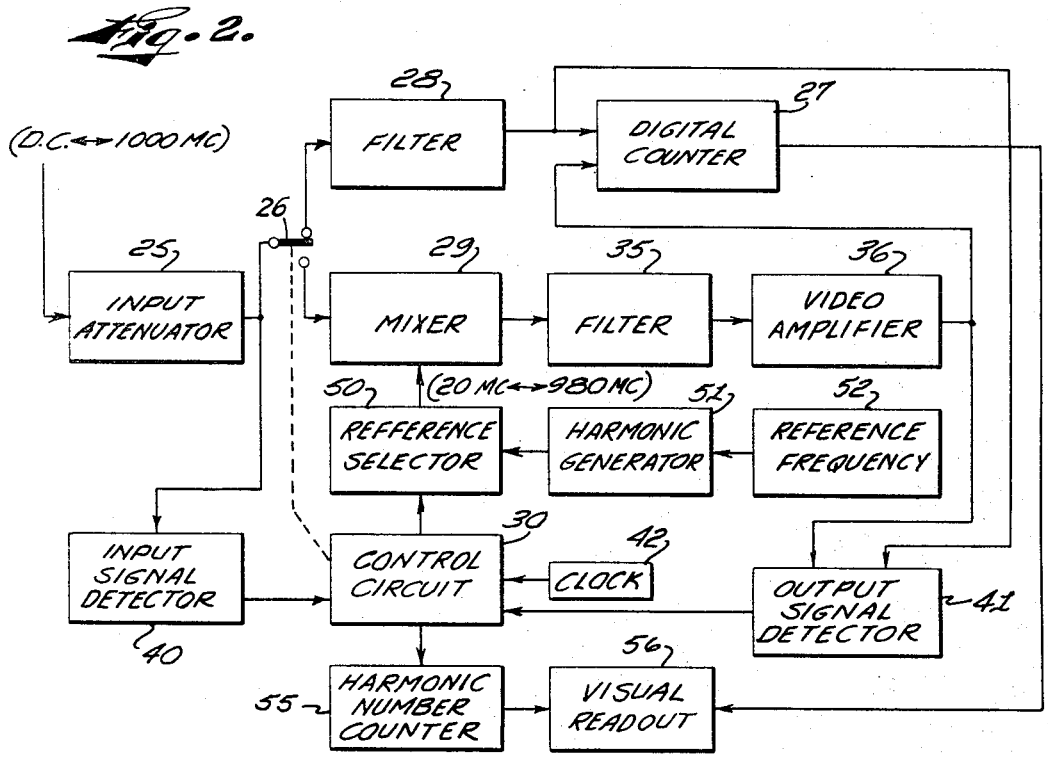
FIG. 2 is a detailed block diagram of an improved wide-range, frequency-measuring device constructed according to the present invention.

Referring now to FIG. 1, there is shown a simplified block diagram of the prior art the invention which comprises a heterodyne unit 10 responsive to the unknown frequency source 11 and a reference frequency selector 12 which sequentially generates or selects a plurality of reference signals successively increasing in frequency by an amount no greater and preferably somewhat less than the frequency range of basic digital counter 15.

By way of specific example, these reference signals may comprise a plurality of harmonics of a stable frequency source 13. The output of the heterodyne unit 10 is connected to the input of the basic digital counter 15, this counter having a maximum counting rate substantially below that of the desired maximum input frequency.

Sequence control circuitry 16 is responsively connected to the basic digital counter 15 and controls the progression of the reference selector 12. The circuitry integral to the sequence control 16 incorporates a counter responsive to the progression of the reference selector 12. A unique digital code for each succeeding reference frequency is combined with the readout portion of the basic digital counter 15.

Sequence control circuitry 16 is responsive to the generation of a difference or beat signal at the output of heterodyne unit 10 suitable to cause a reading on the counter 15. In FIG. 1, an inhibit signal is supplied on line 19 when the basic digital counter 15 receives a difference signal in the range of the counter as described more fully with reference to the exemplary embodiment of FIG. 2. This inhibit signal blocks transmission of changing control signals between the sequence control circuit 16 and the reference generator 12 so that the last generated reference is retained until the measuring unit is reset to perform a subsequent frequency measurement.

*Description of a representative frequency measurement*

A representative frequency measurement with the system of FIG. 1 is as follows: In this example, the following parameters are assumed: A band of DC to 20 mc. for the counter 15 and a range of DC to 1000 mc. for the unknown frequency input signal, a stable frequency source 13 of 20 mc. used for generating a total of 49 reference frequencies from 20 mc. to 980 mc. successively increasing in frequency by 20 mc. If, for example, the unknown input frequency source 11 has a frequency of 75 megacycles, the following sequence of operations takes place: The basic counter 15 is initially set at zero. The application of direct current to the heterodyne fails to produce a difference frequency input to the counter 15 in the band of DC to 20 megacycles. Accordingly, the next control signal causes the reference generator 12 to supply a 20 megacycle reference frequency to the heterodyne unit 10. In addition, the counter portion of circuit 16 records the number indicative of the 20 mc. signal supplied the heterodyne unit. Again, however, no count is registered in the counter since the input frequency of 75 mc. minus the reference frequency of 20 mc. is greater than 20 mc. counting rate of the counter 15. This operation continues until the 60 mc. reference is applied to the mixer 10. At this point, the difference frequency is 15 mc. which is registered by the basic digital counter 15. The output from the heterodyne unit associated with this change is utilized as a control signal over control line 19 for inhibiting the control circuit 16 and causing the 60 mc. reference to be retained until the counting unit is reset to zero. The measured frequency value is provided by means comprising the respective readouts of the basic digital counter 15 (15 mc.) and the counter portion of circuit 16 (60 mc.) which when totaled equal the unknown frequency value of 75 mc. Preferably, a digital adder is included in the system whereby only the single value of 75 mc. is displayed.

*Detailed description of a particular embodiment of the invention*

A detailed block diagram of a particular embodiment of the invention is shown in FIG. 2. The unknown input frequency signal is connected to the input of attenuator 25, the output of which is connected to the movable arm of single pole, double throw switch 26. This switch is controlled by the control circuit 30 to connect the output of attenuator 25 either directly to the digital counter 27 via filter 28 or to the input of the mixer 29. The output of the mixer 29 is connected via filter 35 and video amplifier 36 to the input of digital counter 27. Filter 28 passes a band of frequencies corresponding to the frequency of counter 27, e.g. 0.1 c.p.s. to 20 mc. Filter 35 passes a band corresponding to the frequency separation between the plural reference frequencies, e.g. 0.1 c.p.s. to 20 mc.

*Means for detecting a difference signal having a frequency within the range of the basic digital counter*

In the system described hereinabove with reference to FIGURE 1, the presence or absence of a signal within the range of the digital counter was determined by sensing whether or not the heterodyne unit has an output within the frequency range capability of the digital counter. An improvement is shown in FIG. 2 comprising an input signal detector 40 and an output signal detector 41 either responsive to the output of filter 28 or the output of filter 35 via amplifier 36. A gate circuit within the control circuit 30 is energized by the detector 40 for transmitting pulses from clock 42 to the reference selector 50. Output signal detector 41 produces an output signal for inhibiting the flow thereof. In addition, the control circuit 30 initially connects the movable contact of switch 26 directly to the input of counter 27 via filter 28.

*Reference signal generation and selection*

A plurality of reference signals which successively increase in frequency by an amount at least no greater than the frequency range of the basic digital counter 27 are sequentially generated or selected by the reference selector 50 in combination with the harmonic generator 51 and basic reference frequency source 52. Source 52 preferably comprises an ultrastable source such as a crystal oscillator which delivers a precise frequency of relatively low frequency, e.g. 20 mc. Harmonic generator 51 comprises a nonlinear element which produces a plurality of harmonics of the basic reference frequency. These harmonics will be precisely separated by 20 mc. intervals and comprise the plurality of reference signals which are individually selectable by the reference selector 50 under control of the control circuit 30 and supplied as an input to the mixer 29. By way of specific example, the harmonics may range from 40 mc. to 980 mc. when the maximum signal supplied the input of attenuator 25 is 1,000 mc.

*Harmonic number counter*

The particular harmonic number selected by the reference selector 50 is recorded by the count stored in harmonic number counter 55. This counter may comprise a low speed digital counter whose capacity equals the maximum number of harmonics utilized by the reference selector 50. As shown, the harmonic counter may energize a separate visual readout 56 which is preferably combined with the visual basic digital counter 27 so that the operator need not perform any mental calculations in reading out the precise frequency of the unknown frequency input signal. As shown in FIG. 6 and described hereinafter, this may be readily accomplished by simple digital adders within the counter associated with the stages corresponding to the bits common to the harmonic number counter 55 and the digital counter 27.

*Operation*

The operation of the counter of FIG. 2 is generally similar to that of the system of FIG. 1. The initial sequence comprises connecting the unknown frequency input signal directly to the basic digital counter by switch 26. If the frequency of the input signal lies in the pass band of band pass filter 28, the signal is measured by counter 27 and a signal provided by output signal detector 41 inhibits the control circuit 30. If the frequency of the input signal lies without the band of the filter 28 and thus outside the frequency capability of counter 27, the succeeding pulse generated by clock 42 transfers the movable contact of switch 26 to one input of mixer 29 and supplies the first reference signal to the other input of mixer 29. Successively higher reference frequencies are heterodyned with the input signal in an automatic sequence until a signal at the output of amplifier 36 causes the output signal detector 41 to inhibit the control circuit 30 which is described more fully hereinafter with reference to FIG. 4.

*Detailed description of a particular embodiment of the reference frequency generator and selector*

Figure 3:
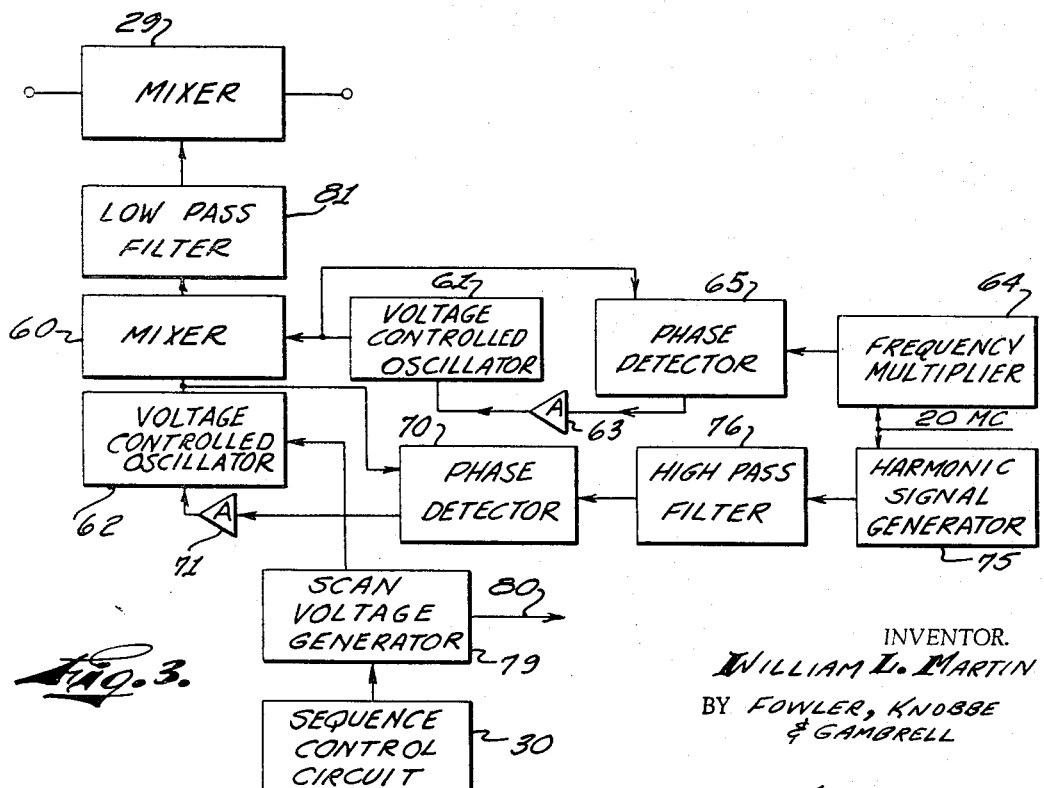
FIG. 3 is a schematic circuit diagram of a specific embodiment of the reference generator.

The reference generator and selector ideally produces a plurality of unique, ultra stable frequencies. In particular, it is important that the generator not have any low frequency output signals other than the selected reference signal. A detailed circuit diagram of a frequency generator and selector which fulfills these requirements is shown in FIG. 3. In this circuit, the set of reference frequencies between 20 and 980 mc. are derived from mixer 60 which is driven by a first voltage controlled oscillator 61 and a second voltage controlled oscillator 62. Oscillator 61 is included within a phase-locked loop comprising a phase detector 65 which supplies a phase locking control voltage to oscillator 61 via an amplifier 63. Fixed frequency multiplier 64 supplies phase detector 65 with the sixtieth harmonic of the 20 mc. reference; accordingly, the phase locking control voltage is determined by phase differences between this 1200 mc. signal and the output of oscillator 61. As a result, an ultra stable 1200 mc. signal is supplied mixer 60 from oscillator 61.

The other voltage controlled oscillator 62 is also connected in a phase-locked loop comprising phase detector 70 which supplies a phase locking control voltage to oscillator 62 via amplifier 71. Phase detector 70 is responsive to the output of oscillator 62 and the output of harmonic signal generator 75. This generator includes a nonlinear element for producing a plurality of hamonics from the 20 mc. reference. In the specific embodiment shown, however, the lower frequency harmonics are removed by a high pass filter 76 so that only the harmonics from 1220 to 2180 mc. are supplied the input of phase detector 70. The particular harmonic to which the oscillator 62 is locked by the phase detector is determined by a scan voltage generator 79 which may, for example, introduce a progression of stepped analog voltages into the oscillator 62. This scan voltage generator is controlled by the control circuit 30 which causes the voltage controlled oscillator 62 to lock on successively higher harmonic frequency signals until an inhibit signal is received from the output signal detector as described hereinabove. The scan voltage generator also provides an output signal on lead 80 indicative of the harmonic number.

The mixer 60 provides the difference between the signal output of oscillator 62 which selectively varies between 1220 to 2180 mc. and the fixed 1200 mc. output signal of oscillator 61 to supply to the mixer 29 reference signals which range between 20 and 980 mc. Preferably, a low pass filter 81 having a cutoff frequency of the order of 1100 mc. is connected between the mixer 60 of the reference generator 50 and the input signal mixer 29.

In FIGS. 4 and 5 are shown specific embodiments of scan voltage generators adapted for use in the reference generator and selector described hereinabove. Referring first to FIG. 4, the sequential control circuit 30 includes a gate 90 which is activated or opened by a signal on lead 91 from the input signal detector for permitting pulses to flow from the clock 42 into a digital servo motor 92. Gate 90 is closed, i.e. the flow of the pulses to the servo motor 92 is interrupted, upon receipt of an inhibit signal on inhibit lead 93 from the output signal detector. Each pulse into the motor 92 advances its output shaft through a predetermined arc, this shaft being coupled to the movable contact 94 of potentiometer 95. The potentiometer resistance element 96 is energized by a potential source represented by battery 97. The scan voltage is derived between ground and the movable potentiometer contact 94.

The particular harmonic coupled to the input mixer signal 29 (FIG. 2) may be determined as shown in FIG. 4 by connecting the harmonic counter 55 to the output of gate 90. Accordingly, this counter is responsive only to the clock pulses applied the digital servo motor 92. Each unique state of the counter may be utilized for generating an output code on lead 99 for energizing the visual readout of other readout apparatus associated with the instrument.

At the conclusion of a frequency measurement, the servo motor 92 is automatically reset to its initial start position by a signal applied to reset lead 100. This signal also serves to reset the harmonic counter 55.

Referring next to FIG. 5, an alternative means for generating the scan voltage comprises a digital to analog converter comprising a plurality of stages 110a, 110b 110c and 110n interconnected to form a binary counter. Each stage drives a respective shunting switch 111, each of which is respectively associated with a different one of a plurality of series connected resistors 112a–112n. These resistors are assigned values according to the desired scan voltage required for each of the sequential clock pulses. If, for example, the frequency of the voltage control oscillator varies linearly with respect to scan voltage, the resistors would normally be assigned values according to an ordinary binary code.

FIG. 5 further illustrates an alternative means for providing coded output signals for the selected harmonic number. Since the digital to analog converter includes a digital counter as an integral portion thereof, respective output leads 115a–115n of stages 110a–110n provide the desired coded output signals.

*Unitary digital readout*

FIG. 6 is a detailed schematic illustration of a unitary digital readout which may be employed for the visual readout 56 (FIG. 2) responsive to the values recorded in both the digital counter 27 and the harmonic number counter 55. Each of the counters 27, 55 may comprise a plurality of binary stages appropriately series connected so that their respective states indicate a number encoded in binary coded decimal form. Thus, a digital counter 27 is shown to include binaries 140, 141, 142, 143 and 144, the first four of which constitutes the units counting decade and the final binary 144 being actuated at the count of 10 megacycles. Similarly, harmonic number counter 55 comprises binaries 145, 146, 147, 148, 149, 150 and 151. Binaries 145, 146 and 147 count the first four harmonics (which result in the reference frequencies of 20, 40, 60 and 80 megacycles respectively) and binaries 148 through 151 in combination with binaries 145 through 147 count the higher order harmonics of 100 megacycles and above. With this arrangement, the visual readout 56 comprises a unit megacycle portion 155 responsive to binaries 140–143, a 10's of megacycles portion 156 responsive to binary 144 of the digital counter 27 and binaries 145–147 of the harmonic number counter. The higher order binaries 148–151 of the harmonic number counter actuates a 100's of megacycles portion 157 of the visual readout 156. In its simplest form, the readout may incorporate four readout means per decade; customarily, however, this unit incorporates a well-known conversion means so as to provide a direct decimal readout from the binary coded decimal input information.

The operation of the readout of FIG. 6 is as follows: When the input signal is below 20 megacycles, it is presumed to be within the capability of the digital counter 27 so that a direct readout thereof is provided by the five binaries 140–144. For example, an input signal of 15 megacycles will actuate binaries 140, 142 and 144 and cause an appropriate indication of 15 megacycles by the visual readout 56. For input signals of 20 megacycles and above, a reference signal is selected by the reference selector 50 and mixed with the input signal and mixer 29. For example, if the input signal is 175 megacycles, the 160 megacycle reference signal will have been selected, which harmonic member will have been counted by the counter 55 and the binaries 145, 146 and 148 actuated. The subtraction of this reference signal from the input signal in the heterodyne leaves a difference signal of 15 megacycles which is counted directly by the digital counter 27, resulting in the actuation of the binaries 140, 142 and 144. The application of appropriate signals on the connecting lines between the actuated binaries 140, 142, 144, 145, 146 and 148 and the visual readout will provide the correct readout of 175 megacycles in the unitary visual readout 56.

*System having an extended frequency range*

These systems described hereinabove have been described with reference to measuring a range of frequencies whose maximum is of the order of 1000 mc. The range of the instrument may be further extended by adding an additional heterodyne stage before the mixer 29. Referring now to FIG. 7, the unknown frequency input signal is selectively connected to shunting lead 125 or the input of a mixer 126 by a single pole, double throw switch 127. Mixer 126 is connected to the input signal when said signal has a frequency above 1000 mc., this mixer being connected to supplementary harmonic generator 128 which selectively supplies one of a plurality of harmonics of a 1000 mc. base frequency produced by multiplier 129 from the 20 mc. stable reference 52 (FIG. 2). Accordingly, the difference frequency at the output of mixer 126 comprises a signal within a 1000 mc. band which may be introduced directly into the mixer 29 of the system of FIG. 2 via a low pass filter 129. Output switch 130 selectively connects either shunting lead 125 or the output of filter 130 to the input attenuator 25 (FIG. 2).

Input switch 127 and output switch 130 and supplementary harmonic generator 128 may be automatically controlled by control circuitry in the manner described hereinabove so that the counter will continue to re-cycle the reference generator 50 (FIG. 2) for each different band of the supplementary harmonic generator 128. In this manner, the frequency of the input signal may be automatically measured even though it has a substantially higher frequency than the range of reference generator 50.

*Wide band frequency scanner or spectrum analyzer*

Referring now to FIG. 8, there is shown a block diagram of still another embodiment of the invention adapted for scanning a very wide frequency band, i.e. a frequency greater than frequency range of the basic digital counter, and recording or logging the frequency energy detected within each one of a plurality of subfrequency bands in this wide band above a present threshold level. The system input terminal 170 is connected to the input attenuator 171. Advantageously, the attenuation level provided by this attenuator may be varied by a control signal applied to the input control circuit 172. The output of the input attenuator 171 is connected to the input of a heterodyne unit 173, which is responsive both to the unknown input frequency signal and a reference frequency selector 174 connected to a reference source 175. This latter component sequentially generates or selects a plurality of discrete reference signals successively increasing in frequency by an amount no greater and preferably somewhat less than the frequency range of the basic digital counter 176, adjacent ones of the reference signals respectively defining a plurality of subfrequency bands. The output of the heterodyne unit 173 is connected via filter 177 to the input of the digital counter 176, this counter having a maximum counting rate generally substantially below that of the desired maximum input frequency.

The generation of a difference signal by heterodyne unit 173 having a frequency lying within the pass band of filter 177 causes a frequency count to be registered in counter 176. Means responsive to the generation of this difference signal comprises one-shot multivibrator 180 coupled to the counter 176 and responsive to the registration of a count therein. This multivibrator in turn controls the gate 181 so that the gate is opened whenever a signal of requisite strength is produced at the output of filter 177. The triggering of multivibrator 180 thus prevents the transmission of clock pulses from clock 182 to the control circuit 183. The delay provided by the one-shot multivibrator 180 is preselected so as to provide sufficient time for the printer 185 to record the frequency registered within the digital counter 176 and the harmonic number counter 186. After this time delay, gate 181 closes and the succeeding clock pulse causes the mixed higher reference frequency to be applied by reference selector 174 to the input of the heterodyne unit 173. This operation continues for each of the subfrequency bands required to span the wide frequency band of the instruction. After the last reference frequency has been recorded by the harmonic number counter 186, a control signal is supplied master control unit 190. This control supplies a signal on lead 191 for opening gate 181. Master control unit 190 also governs the initiation of a new frequency scan by initially applying reset pulses to the digital counter 176 and harmonic number counter 186 via respective reset control lines 192, 193.

Advantageously, the master control 190 is also adapted to supply a signal on control line 172 to the input attenuator 191 so that the threshold level is automatically reset to a different level at the termination of a given frequency measurement. Particular structure for accomplishing this will be well known to those having ordinary skill in the art. For example, the input attenuator may comprise a digitally controlled potentiometer responsive to pulsed inputs from the master control 190 over the control line 172. It will be apparent that this digital attenuator can be so constructed as to either increase or decrease in attenuation value according to the input signals supplied so that the user may select the operational mode desired.

Preferably, the master control is also connected to the printer 185 so as to specify on the printer the particular threshold level set by the input attenuator 171 and thus provide a correlation between the threshold information and the recorded frequency information.

A system shown in FIG. 8 may be used in several ways depending upon the type of frequency information required. In the simple case, the input attenuator 171 is set to a fixed level and the master control 190 actuated thereby resetting the counters 176, 186 and allow clock pulses to be transmitted to the control circuit 183. The successive reference frequencies are then sequentially mixed with the input signal and any frequency energy found in a particular subfrequency band is recorded by the printer 185.

A modification of this operation comprises installing an alarm means (not shown) in combination with or as a substitute for the printer 185. In this manner, the user is given alarm warning whenever frequency energy above a given threshold level is encountered.

The automatically adjustable threshold level allows the user to scan the input signal at a number of present threshold levels so as to define the relative magnitudes of the various frequency components and record them at the printer 185. For example, one operational mode comprises initially setting the threshold level above the expected level of the input signal energy. The wide frequency band is then scanned at this high threshold level and subsequently at successively lower threshold levels, so as to define both the frequency value and also the relative signal strengths of the input signal energy.

Although exemplary embodiments of the invention have been disclosed and discussed, it will be understood that other applications of the invention are possible and the embodiments and methods disclosed may be subjected to various changes, modifications and substitutions without necessarily departing from the spirit of the invention.

I claim:

1. An automatic spectrum analyzer which scans a predetermined frequency band substantially wider than the capability of a basic digital counter incorporated therewith and records the frequency energy within each one of a plurality of subfrequency bands comprising a frequency mixer, sequential reference signal means for generating a plurality of discrete reference signals and sequentially applying same to said frequency mixer, said reference signals differing in frequency by an amount no greater than the frequency range of said basic digital counter with adjacent ones thereof respectively defining said subfrequency bands, means coupling said frequency mixer to the system input signal and a filter coupling said frequency mixer to said basic digital counter so that the difference frequency between said input and said reference signal is applied to said basic digital counter only when the difference frequency is within the frequency band capability of said basic digital counter, means coupled to the output of said filter for inhibiting the application of the next suceeding reference signal to said frequency mixer until a value registered in said digital counter is recorded, and means for continuing to apply each one of a plurality of successive discrete deference signals to said frequency mixer after a value registered in said digital counter is recorded so that the frequency energy in each frequency band is recorded.

2. An automatic frequency scanner as defined in claim 1 comprising attenuation means coupled between the system input signal and said frequency mixer so that only the frequency energy above a preset threshold level is recorded.

3. An automatic frequency scanner as defined in claim 2 comprising control means responsive to the scan of said predetermined frequency band and operatively connected to said attenuation means so that the threshold level is automatically reset upon completion of said scan and a new scan of the system input signal initiated at said reset threshold level.

4. In a device for measuring the frequency of an input signal with a basic digital counter, which frequency may vary over a substantially wider range than said basic digital counter is capable of counting, the combination of first means for automatically generating a reference signal successively increasing in frequency by a fixed amount in response to sequentially occurring pulses, said amount being within the capability of said basic digital counter, second means connected to a source of said input signal and to said reference signal for providing the difference frequency therebetween, and third means connected to the output of said second means and said first means for inhibiting the generation of successively higher frequency reference signals applied to said second means when said difference frequency is in the range of said basic digital counter, said third means comprising a filter having its input terminal connected to said second means to receive a signal of said difference frequency and having a fixed band pass corresponding to the frequency separation between two successive reference signals, means for producing said sequentially occurring pulses, gating means for coupling said sequentially occurring pulses to said first means, and means connected to the output of said filter for closing said gating means to terminate the flow of said pulses to said first means when said difference frequency is in the range of said basic digital counter.

5. In a device for measuring the frequency of an input signal the combination as defined in claim 4 wherein said first means comprises a stable generator of a reference signal the frequency of which is no greater than the range the basic digital counter is capable of counting, means coupled to said stable generator for generating a plurality of harmonic frequencies thereof, and means for sequentially selecting a different one of said harmonic frequencies.

6. In a device for measuring the frequency of an input signal, the combination as defined in claim 5 wherein said means for sequentially selecting a different one of said harmonic frequencies comprises a phase-locked loop including a voltage controlled oscillator and a phase detector supplying a phase-locked control voltage to said oscillator, means connecting said harmonic signal generator means and the output of said oscillator as respective inputs to said phase detector, and means for applying a variable scanning voltage to the input of said voltage controlled oscillator.

7. In a device for measuring the frequency of an input signal, the combination as defined in claim 4 wherein said first means comprises a voltage controlled oscillator, and means for applying a variable scanning voltage to the input of said voltage controlled oscillator.

8. In a device for measuring the frequency of an input signal, the combination as defined in claim 7 wherein said means for applying a variable scanning voltage comprises a motor driven potentiometer, and means for applying drive signals to said motor under control of said third means.

9. In a device for measuring the frequency of an input signal, the combination as defined in claim 7 wherein said means for applying a variable scanning voltage comprises a source of digital clock pulses, a digital pulse counter, a digital-to-analog converter coupled between said digital pulse counter and said voltage controlled oscillator, and means for gating said digital clock pulses to said digital pulse counter under control of said third means.

10. In a device for measuring the frequency of an input signal, the combination as defined in claim 4 wherein said first means comprises means for generating a first signal higher in frequency than the upper frequency range of the unknown frequency input signal connected to said second means, means for generating a plurality of harmonic signals of said first signal, said harmonic frequencies being in a range above the upper frequency band of the unknown frequency signal connected to said second means, means for sequentially selecting a different one of said harmonic frequencies, and means for mixing the selected harmonic frequency and said first signal to produce said reference signals.

11. In a device for measuring the frequency of an input signal, the combination as defined in claim 10 wherein said means for generating said first signal comprises a phase-locked loop including a voltage controlled oscillator, a phase detector supplying a phase locking control voltage to said oscillator, and means connecting a source of said frequency and the output of said oscillator as respective inputs to said phase detector.

12. In a device for measuring the frequency of an input signal, the combination as defined in claim 10 wherein said means for sequentially selecting a different one of said harmonic frequencies comprises
   a voltage controlled oscillator,
   a phase detector supplying a phase locking control voltage to said oscillator,
   means connecting said harmonic signal generator and the output of said oscillator as respective inputs to said phase detector, and
   means for applying a variable scanning voltage to the input of said voltage controlled oscillator.

13. In a device for measuring the frequency of an input signal, the combination as defined in claim 4 wherein said first means is responsive to pulses for generating progressively higher reference frequencies, and wherein said third means comprises
   a source of sequentially occurring pulses,
   gating means for controlling the flow of said pulses to said reference generator, and
   means responsive to the output of said second means for closing said gating means to terminate the flow of said pulses to said reference generator.

14. In a device for measuring the frequency of an input signal, the combination as defined in claim 13 including
   means coupled to the unknown frequency input signal for opening said gating means to initiate the flow of said pulses to the reference generator.

15. In a device for measuring the frequency of an input signal, the combantion as defined in claim 14 including
   a filter having a pass band corresponding to the capability of said basic digital counter initially connecting the unknown frequency input signal to said basic digital counter and said means for opening said gating means.

16. In a device for measuring the frequency of an input signal, the combination as defined in claim 12 including a digital counter connected to said gating means for response to said pulses applied to said reference generator means.

17. In a device for measuring the frequency of an input signal, the combination as defined in claim 16 wherein said first means for generating a signal comprises
   a voltage controlled oscillator, and
   means connected to said source of pulses for supplying stepped analog voltages to said oscillator.

18. In a device for measuring the frequency of an input signal, which frequency may vary over a substantially wider range than the capability of a basic digital counter:
   a source of clock pulses,
   means connected to said source for generating a plurality of reference signals successively increasing in frequency in uniform steps, each step being produced in response to a clock pulse applied thereto and each step being no greater than the frequency range of said basic digital counter,
   reference signal selector means connected to said reference signal generating means,
   a mixer connected to said input signal and to said reference signal selector means and providing the difference frequency therebetween,
   control means for detecting when said difference frequency signals is in the range of said basic digital counter, and in response thereto for inhibiting the further application of clock pulses to said reference selector means, said control means comprising
      a potentiometer having a moveable contact driven by a digital servo motor, and
      means for applying sequentially occurring pulses to said digital servo motor, and including a gate for interrupting application of said pulses to said servo motor,
   means connected to said control means for counting said clock pulses applied to said reference selector means, and
   means for translating to said basic digital counter said difference frequency signal only when it is in the range of said basic digital counter,
   whereby the frequency of an input signal measured is manifested by the combination of clock pulses counted and cycles of said difference frequency signal counted.

References Cited

UNITED STATES PATENTS

| 2,627,033 | 1/1953 | Jensen et al. | 324—79 |
| 2,749,442 | 6/1956 | Hansel. | |
| 2,973,478 | 2/1961 | Hurvitz. | |

FOREIGN PATENTS

| 557,270 | 5/1958 | Canada. |
| 562,314 | 8/1958 | Canada. |

OTHER REFERENCES

"Converter," General Radio Experimenter, December 1962, p. 4.

RUDOLPH V. ROLINEC, *Primary Examiner.*

P. WILLE, *Assistant Examiner.*